(12) United States Patent
Neal et al.

(10) Patent No.: US 6,304,984 B1
(45) Date of Patent: Oct. 16, 2001

(54) METHOD AND SYSTEM FOR INJECTING ERRORS TO A DEVICE WITHIN A COMPUTER SYSTEM

(75) Inventors: Danny Marvin Neal, Round Rock; Steven Mark Thurber, Austin, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/162,936

(22) Filed: Sep. 29, 1998

(51) Int. Cl.$^7$ .................................................. H02H 3/05
(52) U.S. Cl. ................................. 714/57; 710/5; 711/4
(58) Field of Search ................................. 714/57, 41, 48, 714/1, 25, 32, 35, 40, 44, 718; 710/5, 24, 49; 711/4; 712/29

(56) References Cited

U.S. PATENT DOCUMENTS

| | | | |
|---|---|---|---|
| 5,001,712 | * 3/1991 | Splett et al. | 714/703 |
| 5,790,870 | * 8/1998 | Hausauer et al. | 710/260 |
| 5,850,558 | * 12/1998 | Qureshi et al. | 710/269 |
| 5,878,237 | * 3/1999 | Qlarig | 710/128 |
| 5,892,964 | * 4/1999 | Horan et al. | 712/33 |

* cited by examiner

Primary Examiner—Robert Beausoleil
Assistant Examiner—Rita Ziemer
(74) Attorney, Agent, or Firm—Volel Emile; Bracewell & Patterson, L.L.P.

(57) ABSTRACT

A host bridge having a plurality of pre-defined registers used for injecting errors to a selected device so that other devices are not affected and normal systems operations can continue is disclosed. In accordance with the method and system of the present invention, device select lines from each device are brought into the host bridge individually for determining if an error is to be injected to a selected device. First, a register or a bit in a register in the host bridge is matched against an incoming bus operation for the type of bus operation, a load or a store, to inject the error upon. Next, a register having an initial or random value within the host bridge indicates which occurrence of the operation to inject the error. If the value of the register indicates that an error is to be injected, the load or store operation is delayed by forcing zero byte enables until the device identifier of the selected device may be checked against a device register within the host bridge. If the device register indicates the selected device, a type of error indicated by an error register within the host bridge is injected to the selected device and the operation is restarted. Operations to devices, which are not logged in the device register, are permitted to proceed normally, as are bus operations for devices logged in the device register based on the status of the register indicating the occurrence.

19 Claims, 3 Drawing Sheets

METHOD AND SYSTEM FOR INJECTING ERRORS TO A DEVICE WITHIN A COMPUTER SYSTEM

BACKGROUND OF THE INVENTION

1. Technical Field

The present invention relates in general to injecting device errors and in particular to injecting device errors during selected load and store operations. Still more particularly, the present invention relates to preventing a selected load and store operation from getting to a device by detection of which device is the target of the selected load or store operation and injecting specific errors to that particular device in and operating system error recovery code to test the device driver path for those errors.

2. Description of the Related Art

Many data processing or computer systems support a standard input/output (I/O) systems conforming to the peripheral component interconnect (PCI) Local Bus architecture, an architecture supporting many complex features including I/O expansion through PCI-to-PCI bridges, peer-to-peer (device-to-device) data transfers, multi-function devices, and both integrated and plug-in devices. In setting up I/O operations to I/O devices on a PCI bus, the device driver must perform a series of load and/or store operations to the I/O device. If any of these operations gets a parity error on the I/O bus, it is necessary to get this information back to the device driver so that the device driver can stop before the operation is initiated.

As an example, a first store operation may be employed to set up an address in the I/O device, followed by a second store operation signalling the I/O device to begin the data transfer. If the first store operation gets an error and the second store operation is then received, the I/O device might start the operation to the incorrect location. The PCI architecture includes no provision for designing adapters to prevent load and/or store operations from continuing after an error. Most contemporary systems allow device driver execution to continue after a store operation rather than wait for a "successful" response to the store operation to determine if it completes correctly. This is preferable since the processor stall required to wait for a response to store operations would vastly degrade system performance. Currently, I/O adapters have the capability to detect parity errors on the I/O bus and recover from them.

One technique allowing the device driver to prevent subsequent load and/or store operations from completing after an error without waiting for the response to every load or store operation is to have the device select lines from each I/O device be brought into a PCI host bridge individually so that the device number of a failing device may be logged in an error register when an error is seen on the PCI bus. Until the error register is reset, subsequent load and store operations are delayed until the device number of the subject device may be checked against the error register. If the subject device is a previously failing device, the load/store operation to that device is prevented from completing, either by forcing bad parity or zeroing all byte enables. By forcing bad parity or zero byte enables, the I/O device will respond to the load or store request by activating its device select line, but will not accept store data. Operations to devices which are not logged in the error register are permitted to proceed normally, as are all load store operations when the error register is clear. However it is one thing to generate the device driver code to recover from errors and quite another thing to test and debug the code paths, which handle the errors.

In the past, special test I/O adapters have been developed to inject errors onto a bus in order to attempt to test device driver error paths in a development environment. However, these special test adapters have the drawback that they are not shipped with the computer system, and therefore are not available to all device driver writers. Additionally, in order to inject an error, these adapters usually compare on the address of the operation and inject an error after the address has been detected. This error injection technique has the disadvantage in that randomization of errors is not possible and that the I/O adapter has to be set up with an address which will correspond to an address of the device with which to have the error injected upon. Lastly, if multiple devices are to be checked out at the same time, a separate special I/O adapter for each bus in the system is required.

It would be desirable, therefore, to provide a method and system for injecting errors during bus operations in a computer system to a device which does not require a specific address to be set up to correspond to an address of the device which is to have the error injected. It would also be advantageous for the mechanism to provide randomization of errors to be injected while simultaneously not requiring a separate I/O adapter for each bus in a computer system when testing multiple devices on different buses.

SUMMARY OF THE INVENTION

It is therefore one object of the present invention to provide a method and system for injecting errors during load and store operations in a computer system to a selected device.

It is another object of the present invention to provide a method and system which does not require a specific address to be set up to correspond to an address of a selected device to have the error injected upon.

It is yet another object of the present invention to provide a method and system that does not require a separate adapter for each bus in a computer system, therefore testing multiple devices on different buses more easily and with less expense.

The foregoing objects are achieved as is now described. Device select lines from each device in a computer system are brought into a host bridge individually for determining if an error is to be injected to a selected device. The host bridge includes a plurality of pre-defined registers used for injecting errors to a selected device so that other devices are not affected during normal systems operations. First, a register or a bit in a register in the host bridge is matched against an incoming bus operation for the type of bus operation, a load or a store, to inject the error upon. Next, a register having an initial or random value within the host bridge indicates which occurrence of the operation to inject the error. If the value of the register indicates that an error is to be injected, the load or store operation is delayed by forcing zero byte enables until the device identifier of the selected device may be checked against a device register within the host bridge. If the device register indicates the selected device, a type of error indicated by an error register within the host bridge is injected to the selected device and the operation is restarted. Operations to devices, which are not logged in the device register, are permitted to proceed normally, as are bus operations for devices logged in the device register based on the status of the register indicating the occurrence.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
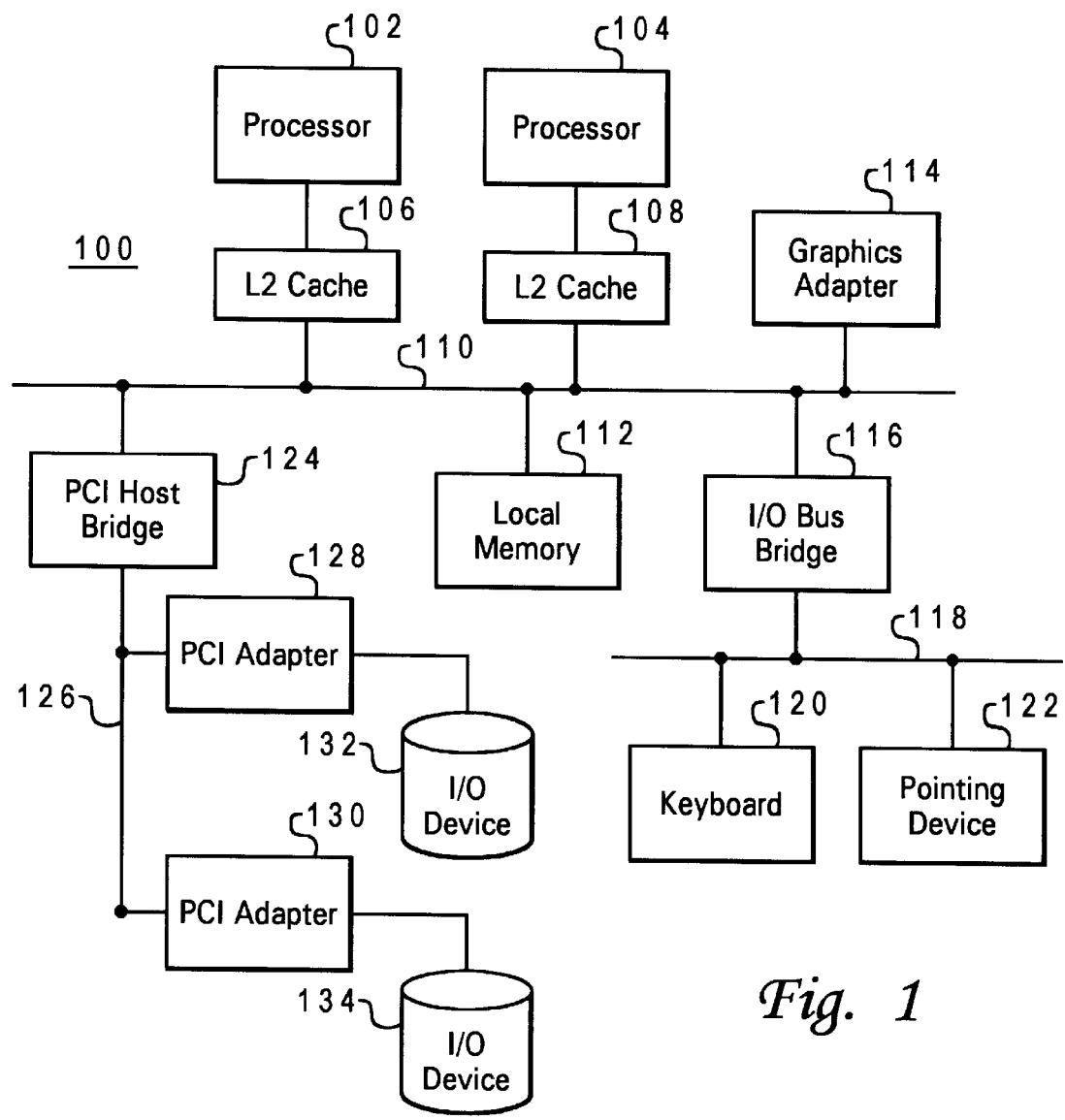
FIG. 1 depicts a block diagram of a data processing system in which a preferred embodiment of the present invention may be implemented.

With reference now to the figures, and in particular with reference to FIG. 1, a data processing or computer system in which a preferred embodiment of the present invention may be implemented is depicted. Data processing or computer system 100 is a symmetric multiprocessor (SMP) system including a plurality of processors 102 and 104, which preferably comprise one of the PowerPC™ family of processors available from International Business Machines of Armonk, N.Y. Although only two processors are depicted in the exemplary embodiment, a single or additional processors may be utilized. The invention is applicable to other systems besides SMP data processing systems, such as uniprocessor systems, NUMA architecture systems, cluster systems, and the like.

Each processor 102 and 104 has an associated level two (L2) cache 106 and 108, respectively, for staging data and instructions to the processors. Processors 102 and 104 are connected, through L2 caches 106 and 108, to system bus 110. Also connected to system bus 110 is local memory 112, a memory mapped graphics adapter 114 providing a connection for a display (not shown), and an input/output (I/O) bus bridge 116 coupling system bus 110 to I/O bus 118. Input devices such as keyboard 120 and a pointing device 122, which may be a mouse, trackball, or the like, are connected to I/O bus 118.

Also connected to system bus 110 in the present invention is a Peripheral Component Interconnect (PCI) host bridge 124, which couples system bus 110 to PCI bus 126. PCI bus 126 includes a plurality of slots for adapters 128 and 130, connecting nonvolatile storage devices 132 and 134 to PCI bus 126. Nonvolatile storage devices 132 and 134 may be magnetic disk drives, solid state disks, or other conventional storage devices.

The operation of data processing or computer system 100 is well known to those in the art. Software contained within storage devices, such as nonvolatile storage devices 132 and 134 or other devices such as a read only memory (ROM), includes an operating system and related routines which are loaded in response to the system being powered on. Such software is loaded into system memory 112 and staged via L2 caches 106 and 108 to processors 102 and 104, as is application software and related data also contained within storage devices 132 and/or 134. Keyboard 120 and pointing device 122 may be employed to control the software applications being executed through a user interface, which may be a graphical user interface.

Those skilled in the art will recognize that data processing or computer system 100 may include many additional components not explicitly shown in FIG. 1, such as serial and parallel ports, connections to networks or attached devices, a controller regulating access to system bus 110 and/or system memory 112, etc. In addition, other system architecture structures, such as NUMA or cluster structures, may be employed in conjunction with the present invention. Such modifications and variations are within the spirit and scope of the present invention.

Figure 2:
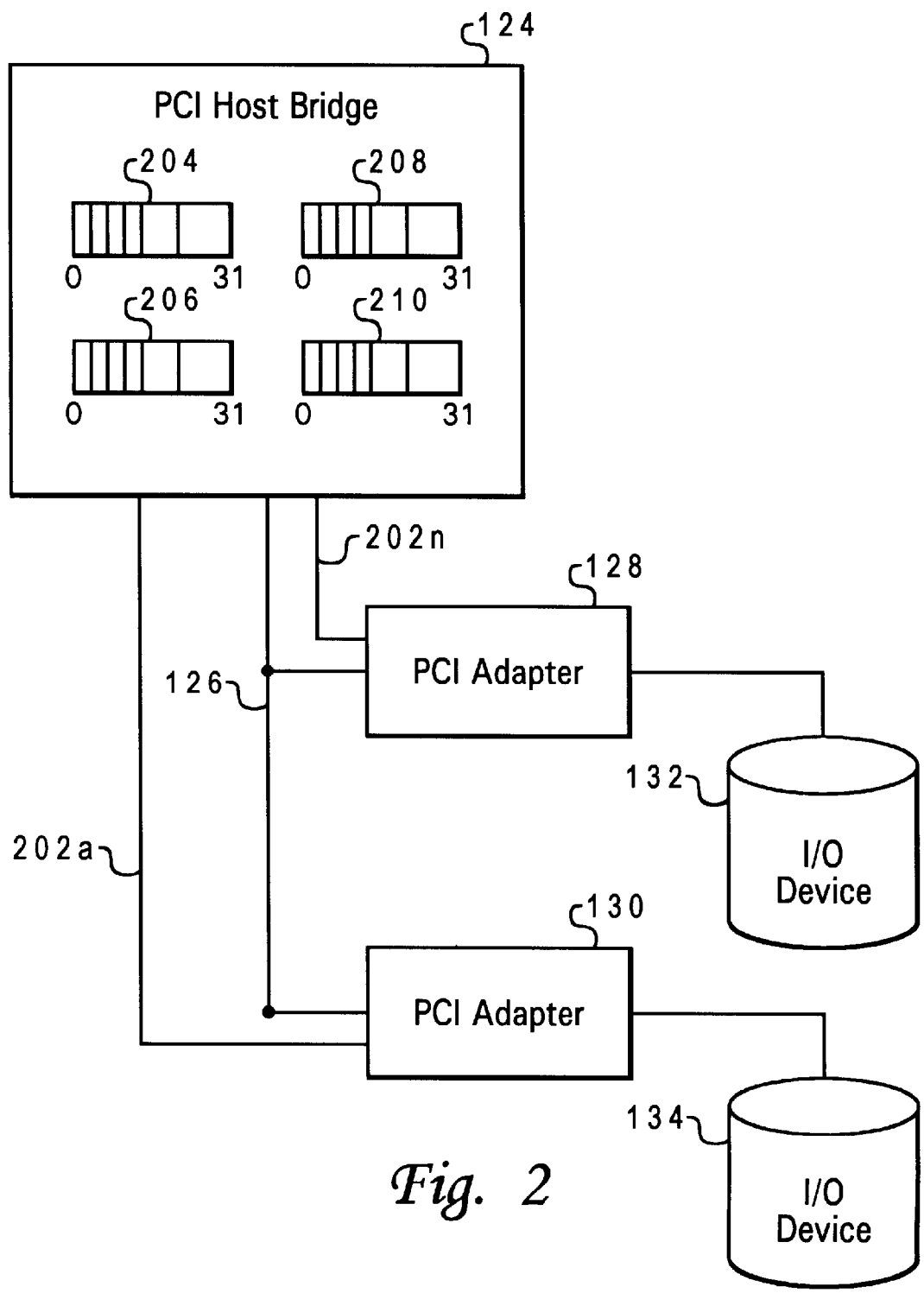
FIG. 2 is a diagram of a peripheral component interconnect host bridge in accordance with a preferred embodiment of the present invention.

Referring now to FIG. 2, a diagram of a peripheral component interconnect host bridge in accordance with a preferred embodiment of the present invention is illustrated. Most I/O devices on most I/O buses are selected by address, and may have several address ranges to which they respond. In the present invention, the problem of injecting specific errors to a particular device in order to test the device driver path for those errors is solved for PCI-based systems by redesigning PCI host bridge 124 to use one or more registers. As shown in FIG. 2, PCI host bridge 124 includes a plurality of pre-defined registers 204–210 used for injecting errors to a selected I/O device so that other I/O devices are not affected and normal systems operations can continue. Individual device select (DEVSEL) lines 202a–202n from each PCI adapter 128 and 130 connected to PCI host bridge 124 are brought into PCI host bridge 124 individually for determining if an error is to be injected to a selected device. First however, a register 204 or a bit in register 204 (hereinafter referred to as the type register) is matched against an incoming load or a store operation, to determine which operation is subject to receiving the error. Register 206 (hereinafter referred to as the occurrence register) contains an initial or random value for indicating which occurrence of the load or store operation to inject the error. Register 208 (hereinafter referred to as the device register) indicates whether the device is the particular device for having the error injected and register 210 (hereinafter the error register) indicates the type of error to be injected to the particular or selected device. Although depicted as 32 bit registers in FIG. 2, it should be understood that any length registers might be used with the present invention. Similarly, it should also be understood that one register in PCI host bridge 124 may be used in lieu of the four registers or any combination of registers thereof within the spirit and scope of the present invention.

Figure 3:
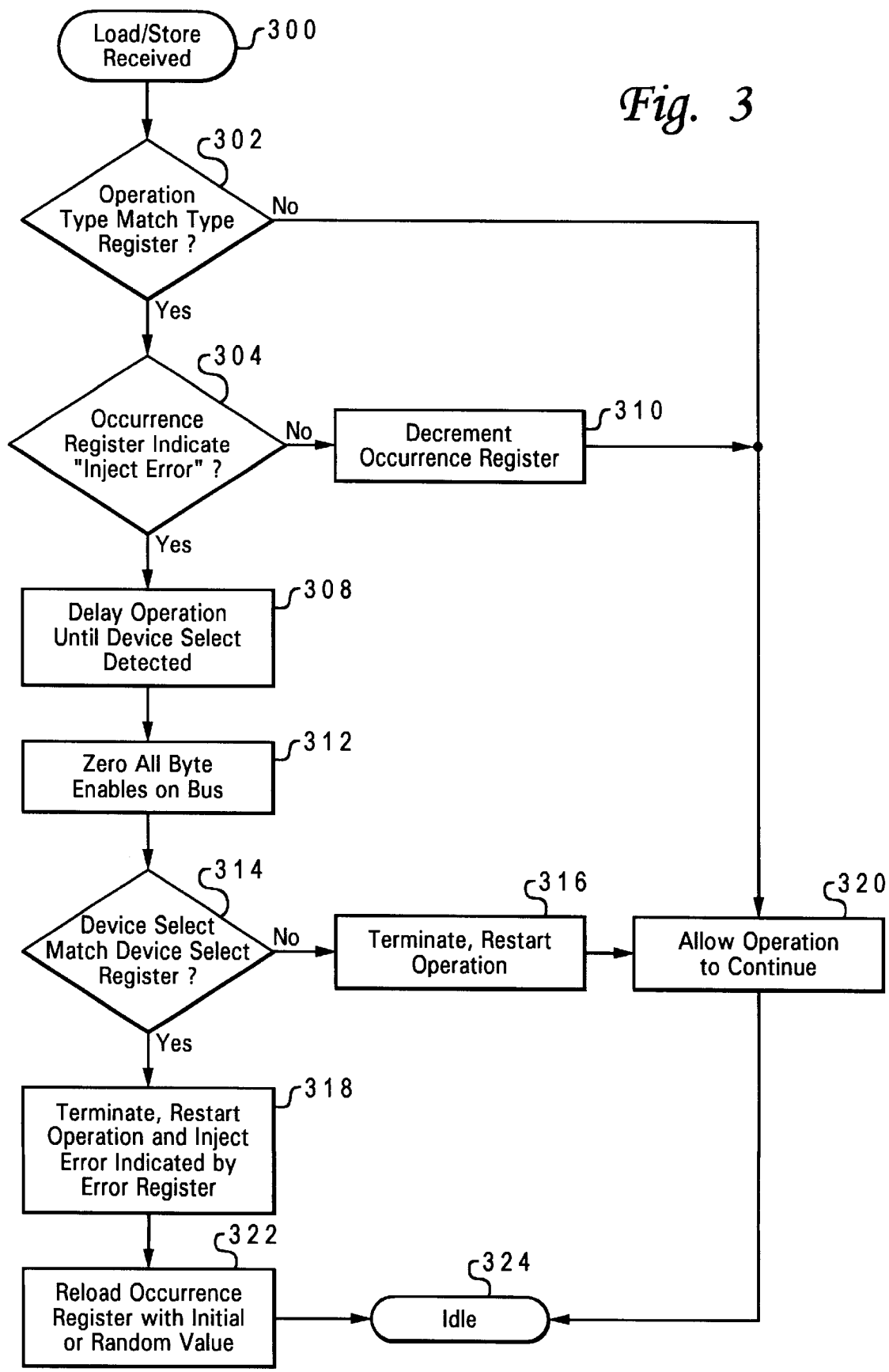
FIG. 3 depicts a high level flowchart for a process to inject an error to a selected device for a selected bus operation in accordance with a preferred embodiment of the present invention.

With reference now to FIG. 3, a high level flowchart for a process for injecting specific errors to a selected device in order to test the device driver path for those errors in accordance with the invention is depicted. The process begins at step 300, which illustrates receiving a load or store operation for a device connected to a PCI bus. The process then passes to step 302, which illustrates determining whether a bit in the type register 204 in the PCI host bridge 124 matches the type of bus operation, either a load or a store, for which to inject the error upon. If not, the process proceeds to step 320, which illustrates allowing the operation to continue. If however the type register 124 matches the bus operation the process continues to step 304 wherein the status of the occurrence register 206 is determined for the time to inject an error. As mentioned before, the occurrence register 206 contains a preset initial value or may contain a random value generated by the hardware. If the register is not in a "zero" state then no error is to be injected and the process proceeds to step 310 wherein the occurrence register 206 is decremented by one and the process proceeds to step 320, which again illustrates allowing the operation to continue.

Referring once again to FIG. 3, if the value of the occurrence register indicates a "zero" or that an error is to be injected, the process proceeds to step 308 which depicts delaying completion of a read or write corresponding to the load or store until the device select lines may be read. This may be accomplished using the initiator ready (IRDY) signal line within the PCI bus. By not activating the initiator ready line, the read or write may be delayed until the device select indicator (also referred to herein as the device identifier or the device number) on the device select lines has been checked against the device number being held in the device register 208, as will be more fully described below. Thus, the process passes to step 312, which illustrates placing all zero byte enables (BEs) on the bus (that is, all inactive). This will indicate to the I/O device not to pull any data off the bus on a store operation and not to have any side effects from the resulting read on a load operation.

The process next passes to step 314, which depicts a determination of whether the device number on the device select lines is contained within the device register 208 in the PCI host bridge 124. If the device register 208 indicates that the device is a selected device for injecting an error, the process proceeds to step 318. Step 318 illustrates injecting a type of error indicated by the error register 210 within the host bridge wherein once the error is injected to the selected device, the operation is terminated and restarted by activating the initiator ready signal. Lastly, the process, proceeds to step 322 wherein the occurrence register 206 having a value of "zero" is reloaded with either the same or another preset value or a random value. It should be noted that operations to devices, which are not logged in the device register 208, are permitted to proceed normally, as are bus operations for devices logged in the device register based on the status of the occurrence register 206.

If the device number does not match the device identifier logged in the device register 208, the process proceeds instead to step 316, which depicts terminating and restarting the operation. This may be accomplished by activating the initiator ready signal and allowing the operation to continue by restarting the operation with the first address and valid byte enables. The process next passes to step 320, which illustrates allowing the process to continue normally. As shown in FIG. 3, the process passes either of steps 302, 310 or 316, through step 320 to step 324, which illustrates the process becoming idle until another load/store operation is received so that system performance during normal operations is not affected and operations are only delayed during error injection.

The present invention provides injecting errors during load and store operations in a computer system to a selected device which does not require any changes to PCI adapter hardware and without requiring a substantial amount of processor time. The method of the present does not require a specific address to be set up to correspond to an address of a selected device to have the error injected upon, and does not impact performance during normal system operations. The method of the present invention also does not require a separate adapter for each bus in a computer system, therefore being able to test multiple devices on different buses more easily and with less expense.

While the invention has been particularly shown and described with reference to a preferred embodiment, it will be understood by those skilled in the art that various changes in form and detail may be made therein without departing from the spirit and scope of the invention.

What is claimed is:

1. A method of injecting errors to a device within a computer system having one or more devices coupled to a bus via a host bridge which includes a register, comprising:

receiving a selected bus operation and determining if an error is to be injected to a selected device;

responsive to determining that an error is to be injected, delaying said selected bus operation until said selected device is identified by determining a status of said register within said host bridge for said selected device;

responsive to identifying said selected device, injecting said error to said selected device; and responsive to determining that said register indicates a different device, terminating and restarting said selected bus operation and allowing said selected bus operation to proceed.

2. The method of claim 1, wherein said computer system includes a host bridge coupling said one or more devices to said bus, said host bridge including a register, wherein the step of receiving said selected bus operation further comprises:

checking a status of said register within said host bridge for said selected bus operation.

3. The method of claim 2, further comprising:

responsive to determining that said register indicates a different bus operation, allowing said selected bus operation to proceed.

4. The method of claim 1, wherein said computer system includes a host bridge coupling said one or more devices to said bus, said host bridge including a register, wherein the step of determining if said error is to be injected to said selected device further comprises:

determining a status of said register within said host bridge for injecting an error.

5. The method of claim 4, further comprising:

responsive to determining that said error is not to be injected to said device, decrementing said register and allowing said selected bus operation to proceed.

6. The method of claim 1, wherein said computer system includes a host bridge coupling said one or more devices to said bus, wherein the step of delaying said bus operation until said device is identified further comprises:

not activating an initiator ready signal.

7. The method of claim 1, wherein said computer system includes a host bridge coupling said one or more devices to said bus, wherein the step of delaying said bus operation until said device is identified further comprises:

placing all zero byte enables for said bus operation on said bus.

8. The method of claim 1, wherein said computer system includes a host bridge coupling said one or more devices to said bus, said host bridge including a register, wherein the step of injecting said error to said selected device further comprises:

checking a status of an error register within said host bridge for injecting a type of error to said selected device and terminating and restarting said selected bus operation.

9. The method of claim 8, wherein said host bridge includes a register having a value for determining if said error is to be injected to said device, wherein the step of injecting said error and restarting said selected bus operation further comprises:

resetting said register with an initial or random value.

10. A computer system for injecting errors to one of a multiple of devices coupled to a bus, comprising:

means for determining if an error is to be injected to a selected device upon receiving a selected bus operation;

means for delaying said selected bus operation if an error is to be injected until said selected device is identified by determining a status of a register within a host bridge for said selected device;

means for identifying said selected device and injecting said error to said selected device; and means for terminating and restarting said selected bus operation and allowing said selected bus operation to proceed in response to a determination that said register indicates a different device.

11. The computer system of claim 10, further including means for checking a status of a register within a host bridge for determining if said error is to be injected to said selected device in response to receiving said selected bus operation.

12. The computer system of claim 11 further including means for allowing said selected bus operation to proceed in response to a determination that said register indicates a different bus operation.

13. The computer system of claim 10, wherein means for determining if said error is to be injected to said selected device includes determining a status of a register within a host bridge.

14. The computer system of claim 13 further including means for decrementing said register and allowing said selected bus operation to proceed in response to a determination that said register indicates that said error is not to be injected to said device.

15. The computer system of claim 10, wherein means for delaying said selected bus operation includes not activating an initiator ready signal.

16. The computer system of claim 10, wherein means for delaying said selected bus operation includes placing all zero byte enables for said bus operation on said bus.

17. The computer system of claim 10, wherein said means for injecting said error to said selected device includes means for determining a status of an error register within a host bridge for injecting a type of error to said selected device and for terminating and restarting said selected bus operation.

18. The computer system of claim 17, wherein said host bridge includes a register having vale means for determining if said error is to be injected to said selected device for resetting said register with an initial or random value when injecting said error and restarting said selected bus operation.

19. A mechanism for injecting errors to a device within a computer system having one or more devices coupled to a bus, comprising:

a host bridge including a plurality of registers coupling said one or more devices to said bus wherein said host bridge includes:

means, responsive to receiving a load or store operation, checking a status of a type register;

means, responsive to determining that said type register matches said load or store operation, checking a status of an occurrence register having an initial or random value for determining to inject an error to a selected device;

means, responsive to determining that said error is to be injected, delaying said load or store operation until a device identifier for said selected device for said load or store operation may be checked against a device register;

means, responsive to determining that said device register matches said device identifier, injecting an error indicated by a error register to said selected device, terminating and restarting said load or store operation and allowing said load or store operation to proceed.

* * * * *